United States Patent [19]

Bauer et al.

[11] Patent Number: 4,645,250

[45] Date of Patent: Feb. 24, 1987

[54] BUMPER-RADIATOR GRILL ASSEMBLY

[75] Inventors: Helmut Bauer, Trebur; Karl F. Reuter, Kelsterbach, both of Fed. Rep. of Germany

[73] Assignee: General Motors Corporation, Detroit, Mich.

[21] Appl. No.: 818,177

[22] Filed: Jan. 13, 1986

[30] Foreign Application Priority Data

Jul. 4, 1985 [DE] Fed. Rep. of Germany ....... 3523909

[51] Int. Cl.⁴ .............................................. B62D 25/08
[52] U.S. Cl. .................................... 293/115; 180/68.6
[58] Field of Search ........................ 293/115; 180/68.6; 296/31 P

[56] References Cited

U.S. PATENT DOCUMENTS 3,792,889  2/1974  Fuener et al. ......................... 293/115
4,354,566 10/1982  Yuda ................................... 180/68.6
4,406,489  9/1983  Trabert ................................ 293/115

FOREIGN PATENT DOCUMENTS 34543  4/1981  Japan .................................. 293/115

Primary Examiner—Robert R. Song
Attorney, Agent, or Firm—R. L. Phillips

[57] ABSTRACT

A radiator grill is provided with a snap-in plug for engagement into a contoured aperture provided in a bumper. The grill is retained at the rearward end of the bumper by means of retaining hooks. The grill is also provided at its rearward portion with slip ramps which are positioned on the upper side of the bumper so as to cause forward pivoting of the grill that eliminates a gap that may otherwise be created between the grill and the bumper at the forward edge of the grill.

4 Claims, 7 Drawing Figures

BUMPER-RADIATOR GRILL ASSEMBLY

TECHNICAL FIELD

The invention relates to a bumper having a radiator grill attached thereto, especially for use on passenger cars.

BACKGROUND OF INVENTION

In present day passenger cars, the radiator grill is either structurally integrated with the bumper so as to form a one-piece unit, or the grill is a separate component which is attached to the bumper with bolts. Both arrangements have certain shortcomings. The shortcoming of the unitized arrangement is that changes in the grill design in conjunction with periodic model changes of cars are usually associated with costly investments for new bumper tools. The disadvantage of the conventional two-part bumper grill arrangement is the relatively high assembly costs entailed in securing the grill to the bumper. Another consideration of the conventional two-part arrangement is that the gap between the grill and the upper edge of the bumper is not very pleasing to the eye, especially if that gap, due to manufacturing tolerances, is relatively wide.

SUMMARY OF THE INVENTION

It is the object of the present invention to incorporate features into a bumper grill assembly which permits the grill to be attached to the bumper in a simple and cost-favorable manner.

In accordance with the present invention, this object is accomplished by providing the grill with a snap-in plug formed on its forward portion that is adapted for snap-in engagement into a suitably contoured aperture, such aperture being formed in the upper side of the bumper and being provided with a narrowing front portion, and the grill then further provided with at least one retaining hook that is adapted to engage the upper rearwardly facing edge of the bumper from below.

This arrangement greatly facilitates the procedure of securing the radiator grill to the bumper, and the operation does not require the use of tools inasmuch as the grill is simply plugged into the bumper and then pushed forwardly. Furthermore, this arrangement obviates the necessity of using mounting bolts and also saves time that would otherwise be needed for tightening the bolts. The provision of the snap-in plug permits bumper grill preassembly, so that the bumper and grill can be transported as an assembled unit to the car assembly line. The two-piece arrangement of the bumper grill assembly has the advantage that the radiator grill and the bumper can be provided with different surface finishes, e.g., painted, chromed, tinted or grained surfaces. Furthermore, the present invention enables the expenditures associated with annual or periodic model changes to be significantly reduced since the overall appearance of the car can be altered by the simple procedure of altering the appearance of the radiator grill. The arrangement according to the invention also facilitates repair work on the car because it permits installation and removal of the grill without prior removal of the bumper, headlights or the radiator, so that the costs for repair work are considerably reduced.

In accordance with one particularly advantageous arrangement, the radiator grill is provided at its rearward portion with slip ramps which serve to support the grill on the upper side of the bumper. The lower edge of the slip ramps extend to a depth which enables the forward edge of the grill to be pivoted in engagement with the upper side of the bumper. As a result, the gap that usually exists between the forward edge of the grill and the upper edge of the bumper is completely eliminated and thus creates the illusion of a unitary bumper grill assembly. Moreover, the appearance of the bumper grill assembly is further enhanced in that there are no fastening elements visible on the assembly.

In accordance with another suitable structural arrangement, the snap-in plug is comprised of a downwardly projecting cylindrical portion having formed thereon a semi-circular collar which is in parallel alignment with the upper side of the bumper, and with the associated aperture contoured correspondingly.

The invention also incorporates means which prevent disengagement of the grill from the bumper in the event the grill is subjected to minor frontal impacts. This is accomplished in that the grill is provided with barb-like locking projections which, in the assembled state of the bumper grill unit, are in locking engagement with corresponding oblong apertures provided in the upper side of the bumper. Each barb-like locking projection has a substantially vertical extending end face which is in engagement with the associated rear wall of the oblong apertures.

It should be appreciated that a variety of arrangements may be utilized in the practice of the invention. In order to convey the concept of the invention, the preferred embodiment is illustrated in the drawings and described in the following specifications.

DESCRIPTION OF PREFERRED EMBODIMENT

Figure 1:
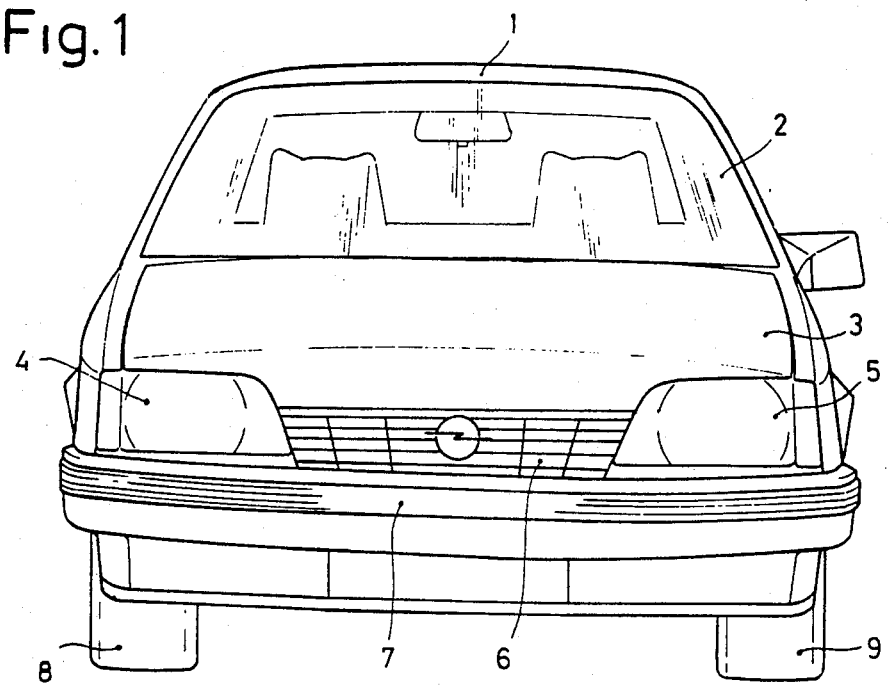
FIG. 1 is a front elevation of a motor vehicle equipped with the preferred embodiment of the bumper grill assembly according to the present invention.

FIG. 1 illustrates a motor vehicle including a roof 1, a windshield 2, an engine hood 3, headlights 4, 5, a radiator grill 6, a bumper 7 and a pair of front wheels 8, 9. The present invention is characterized by the manner in which the radiator grill 6 and the bumper 7 are joined together. This feature will become more apparent from FIG. 2.

Figure 2:
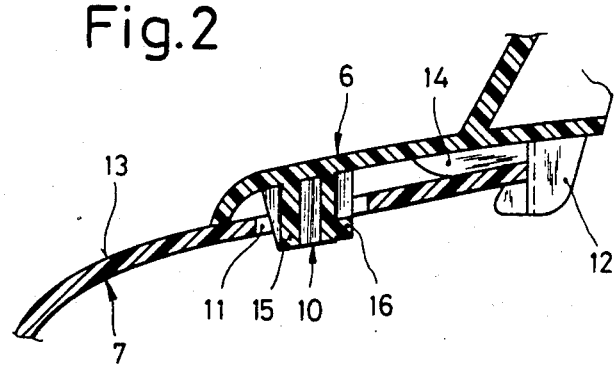
FIG. 2 is a section, as viewed in the direction of vehicle travel, through a portion of the bumper grill assembly according to the invention.

FIG. 2 illustrates an upper portion of the bumper 7 onto which is seated the radiator grill 6. The grill 6 has a snap-in plug 10 which extends through a suitably contoured aperture 11 into the bumper 7. The grill 6 is further retained on the bumper 7 at the rearward edge thereof through retaining hooks 12 which engage the upper side 13 of the bumper 7 from below. It is also apparent from FIG. 2 that the grill 6 is provided on its downwardly facing side with a slip ramp 14 that is used to support the grill 6 on the upper side 13 of the bumper 7.

Figure 3:
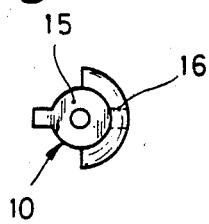
FIG. 3 is an illustration of the snap-in plug as viewed from below.

The snap-in plug 10 is comprised, as is also apparent from FIG. 3, of a cylindrical portion 15 which has a collar 16 formed thereon. The collar 16 extends parallel to the back of the upper side 13 of the bumper 7 and, when in the assembled state, engages the bumper 7 from beneath.

Figure 4:
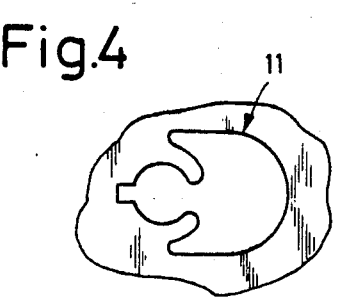
FIG. 4 is a plan view of the contoured aperture in the bumper for receiving the snap-in plug.

FIG. 4 illustrates the configuration of the aperture 11. It is apparent from this figure that the rear portion of the aperture 11 is of relatively large cross-section to facilitate insertion of the collar 16 from above, whereas the forward portion is just large enough to accommodate the cylindrical portion of the snap-in plug 10. This arrangement prevents the snap-in plug 10 from escaping upwardly out of the contoured aperture 11 when the radiator grill 6, after it has been inserted into the bumper 7, is being pushed forwardly.

Figure 5:
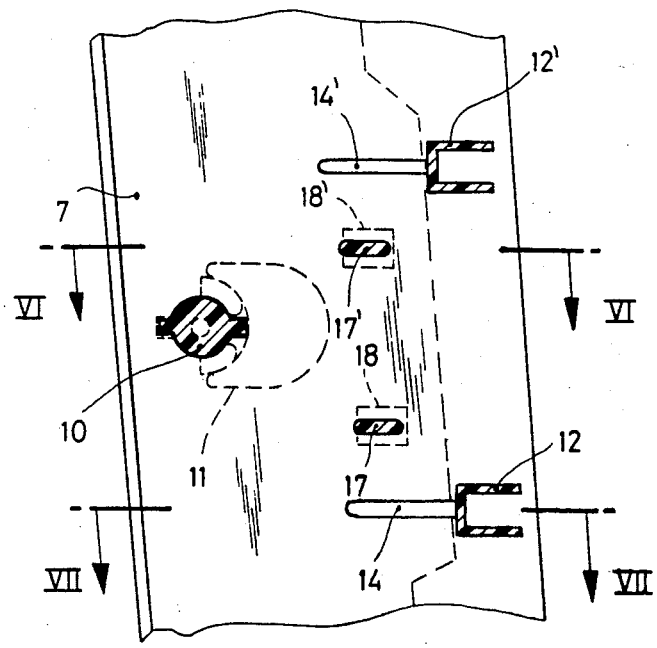
FIG. 5 is a horizontal section through the arrangement along the upper edge of the bumper.

FIG. 5 shows the top of the bumper 7, including a sectional view of the snap-in plug 10 as it is seated in the contoured aperture 11, which is indicated in broken lines. One will also note in FIG. 5 a pair of retaining hooks 12, 12' which engage the backside of the bumper 7 from below. The slip ramps 14, 14' are also illustrated in FIG. 5. Also illustrated in FIG. 5 are a pair of locking projections 17, 17' which are in locking engagement with the oblong apertures 18, 18'. This feature is illustrated in greater detail in FIG. 6.

Figure 6:
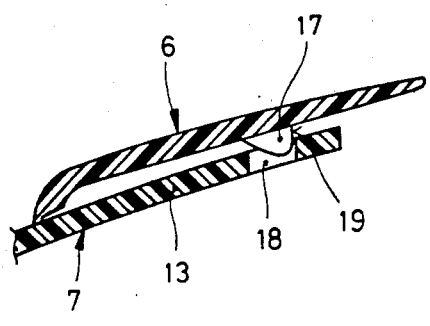
FIG. 6 is a section along line 6—6 according to FIG. 5.

FIG. 6 illustrates the upper side 13 of the bumper 7 and the radiator grill 6. The section in FIG. 6 through the grill 6 and the bumper 7 extends along a path designed to illustrate the oblong aperture 18 with the locking projection 17. This locking projection 17 has a rearwardly disposed arresting surface 19 by which the locking projection 17 is retained against the rear wall of the oblong aperture 18. This prevents the radiator grill 6 from being displaced towards the rear.

Figure 7:
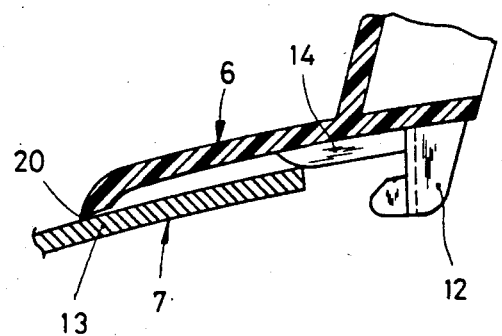
FIG. 7 is a section along line 7—7 according to FIG. 5.

It is apparent from FIG. 7 that the slip ramps 14 extend somewhat below the forward edge 20 of the radiator grill 6. Thus, when the grill 6 is moved forwardly, the slip ramps 14, 14' will cause the grill 6 to be lifted up and to be pivoted counterclockwise. This will cause the forward edge 20 of the grill to be firmly urged against the upper side 13 of the bumper 7 and will create the illusion of a unitary bumper grill construction.

The above described preferred embodiment is illustrative of the invention which may be modified within the scope of the appended claims.

The embodiments of the invention in which an exclusive property or privilege is claimed are defined as follows:

1. A motor vehicle bumper with radiator grill attached thereto characterized by the radiator grill being mounted in a front region thereof by a locking projection that engages in a shaped hole which is reduced towards the front, in an upper side of the bumper, and being mounted in a rear region thereof by at least one catch hook that engages beneath an upper rear edge of the bumper.

2. A motor vehicle bumper with radiator grill attached thereto according to claim 1, further characterized by the radiator grill being mounted in the rear region thereof by slip ramps on the upper side of the bumper having lower edges that extend so low that the grill is pivoted by a front edge thereof onto the upper side of the bumper by seating of the slip ramps.

3. A motor vehicle bumper with radiator grill attached thereto according to claim 1 or 2 further characterized by the locking projection comprising a downwardly projecting cylinder and, integrally formed thereon, a semicircular flange extending parallel to the upper side, and with the shaped hole shaped correspondingly.

4. A motor vehicle bumper with radiator grill attached thereto according to claim 1, further characterized by the grill having barb-like locking projections which, when the grill is assembled to the bumper, engage in corresponding slots in the upper side of the bumper and abut by an approximately vertical locking face against the rear walls of the slots.

* * * * *